(12) United States Patent
Zhou et al.

(10) Patent No.: US 12,633,736 B2
(45) Date of Patent: *May 19, 2026

(54) MOTOR CONTROL DEVICE WITH SOLID STATE CIRCUIT BREAKER

(71) Applicant: EATON INTELLIGENT POWER LIMITED, Dublin (IE)

(72) Inventors: Xin Zhou, Wexford, PA (US); Huaqiang Li, Menomonee Fall, WI (US); Thomas Ruchti, Pewaukee, WI (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 11 days.

This patent is subject to a terminal disclaimer.

(21) Appl. No.: 18/226,441

(22) Filed: Jul. 26, 2023

(65) Prior Publication Data

US 2023/0378744 A1     Nov. 23, 2023

Related U.S. Application Data

(63) Continuation of application No. 16/756,307, filed as application No. PCT/IB2018/056582 on Aug. 29, 2018, now Pat. No. 11,791,619.

(60) Provisional application No. 62/551,547, filed on Aug. 29, 2017.

(51) Int. Cl.
| | |
|---|---|
| *H02H 3/16* | (2006.01) |
| *H02H 1/00* | (2006.01) |
| *H02H 7/08* | (2006.01) |
| *H02H 7/20* | (2006.01) |

(52) U.S. Cl.
CPC ........ *H02H 7/0833* (2013.01); *H02H 1/0007* (2013.01)

(58) Field of Classification Search
CPC .................................. H02P 23/00; H02P 6/16
See application file for complete search history.

(56) References Cited

U.S. PATENT DOCUMENTS

| | | | | |
|---|---|---|---|---|
| 2006/0256470 | A1* | 11/2006 | Juds | H01H 33/38 |
| | | | | 360/123.57 |
| 2009/0273866 | A1* | 11/2009 | Chan | H02H 3/338 |
| | | | | 361/45 |

(Continued)

*Primary Examiner* — Muhammad S Islam
*Assistant Examiner* — Charles S Laughlin
(74) *Attorney, Agent, or Firm* — Eckert Seamans Cherin & Mellott, LLC

(57)     ABSTRACT

A combination motor control device includes a power circuit structured to sense voltage and/or current flowing through the combination motor control device, a semiconductor switching and interruption circuit including a number of solid state transistors and being operable to turn on to allow power to flow through the combination motor control device and to turn off to stop allowing power to flow through the combination motor control device, and a control circuit structured detect faults in power flowing through the combination motor control device based on the sensed voltage and/or current, to control the semiconductor switching and interruption circuit to provide a motor starter and/or motor controller functionality, and to control the semiconductor switching and interruption circuit to turn off in response to detecting a fault in power flowing through the combination motor control device.

18 Claims, 5 Drawing Sheets

(56)　　　　　References Cited

U.S. PATENT DOCUMENTS

| | | | | |
|---|---|---|---|---|
| 2013/0235618 | A1* | 9/2013 | Dillig | H02H 7/1216 |
| | | | | 363/16 |
| 2014/0001988 | A1* | 1/2014 | Kanzaki | B60L 3/0046 |
| | | | | 318/400.3 |

* cited by examiner

MOTOR CONTROL DEVICE WITH SOLID STATE CIRCUIT BREAKER

CROSS-REFERENCE TO RELATED APPLICATIONS

This application is a continuation of U.S. Non-Provisional patent application Ser. No. 16/756,307, filed Apr. 15, 2020, which is the national stage of International (PCT) Patent Application No. PCT/IB18/056582, filed Aug. 29, 2018, which claims the benefit of U.S. Provisional Patent Application Ser. No. 62/551,547, filed Aug. 29, 2017, all of which are incorporated by reference herein.

BACKGROUND

Field

The disclosed concept relates generally to motor control devices, and in particular, to motor starters and motor controllers.

Background Information

Electric motor systems generally include an electric motor and external equipment such as a motor starter and/or a motor controller to start and control the electric motor. To provide circuit protection, circuit breakers or fuses are provided in addition to the motor starter and/or motor controller. The addition of the circuit breakers or fuses adds to the cost and complexity of the electric motor system. The circuit breakers and fuses themselves and the necessity of wiring the circuit breakers or fuses to the motor starter and/or motor controller adds overall cost to the system.

FIGS. 1A and 1B show examples of electric motor systems. FIG. 1A shows an electric motor system 1 including an electric motor 2, an electric motor controller 3, fuses and/or circuit breakers 4, and a transformer 5. FIG. 1B shows another electric motor system 11 including an electric motor 12, an electric motor controller 13, an active rectifier 14, an LCL filter 15 and fuses and/or circuit breakers 16. As shown in FIGS. 1A and 1B, fuses and/or circuit breakers are provided in addition to the electric motor controllers that drive the electric motors.

There is room for improvement in motor starters and motor controllers.

SUMMARY

In accordance with an aspect of the disclosed concept, a combination motor control device comprises: a power circuit structured to sense voltage and/or current flowing through the combination motor control device; a semiconductor switching and interruption circuit including a number of solid state transistors and being operable to turn on to allow power to flow through the combination motor control device and to turn off to stop allowing power to flow through the combination motor control device; and a control circuit structured detect faults in power flowing through the combination motor control device based on the sensed voltage and/or current, to control the semiconductor switching and interruption circuit to provide a motor starter and/or motor controller functionality, and to control the semiconductor switching and interruption circuit to turn off in response to detecting a fault in power flowing through the combination motor control device.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figures 1A, 1B, 2:
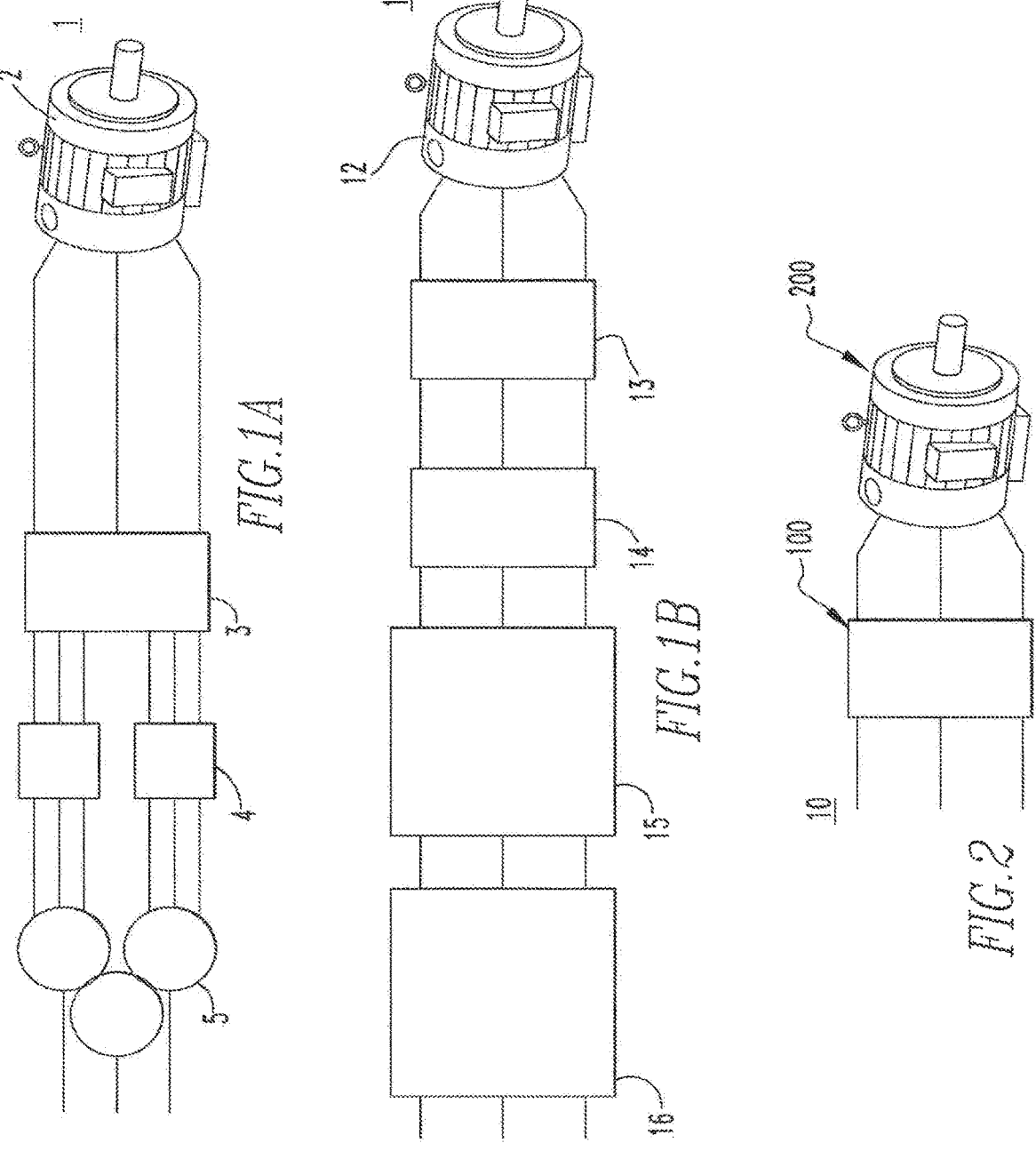
FIGS. 1A and 1B are examples of electric motor systems.
FIG. 2 is a diagram of an electric motor system in accordance with an example embodiment of the disclosed concept.

Directional phrases used herein, such as, for example, left, right, front, back, top, bottom and derivatives thereof, relate to the orientation of the elements shown in the drawings and are not limiting upon the claims unless expressly recited therein.

As employed herein, the statement that two or more parts are "coupled" together shall mean that the parts are joined together either directly or joined through one or more intermediate parts.

As employed herein, the term "processor" shall mean a programmable analog and/or digital device that can store, retrieve, and process data; a microprocessor; a microcontroller; a microcomputer; a central processing unit; or any suitable processing device or apparatus.

FIG. 2 is a diagram of an electric motor system 10 in accordance with an example embodiment of the disclosed concept. The electric motor system 10 includes a combination motor control device 100 and an electric motor 200. The combination motor control device 100 may be, for example and without limitation, a motor starter and/or a motor controller in combination with a circuit breaker or a fuse. The combination motor control device 100 provides the functionality of a solid state circuit breaker. In some example embodiments of the disclosed concept, the combination motor control device 100 is able to detect faults (e.g., without limitation, arc fault, ground fault, overcurrent, etc.) and responsively initiate a trip to stop current from flowing to the electric motor 200. Example embodiments of the combination motor control device 100 will be described in more detail with respect to FIGS. 3 and 4.

Figure 3:
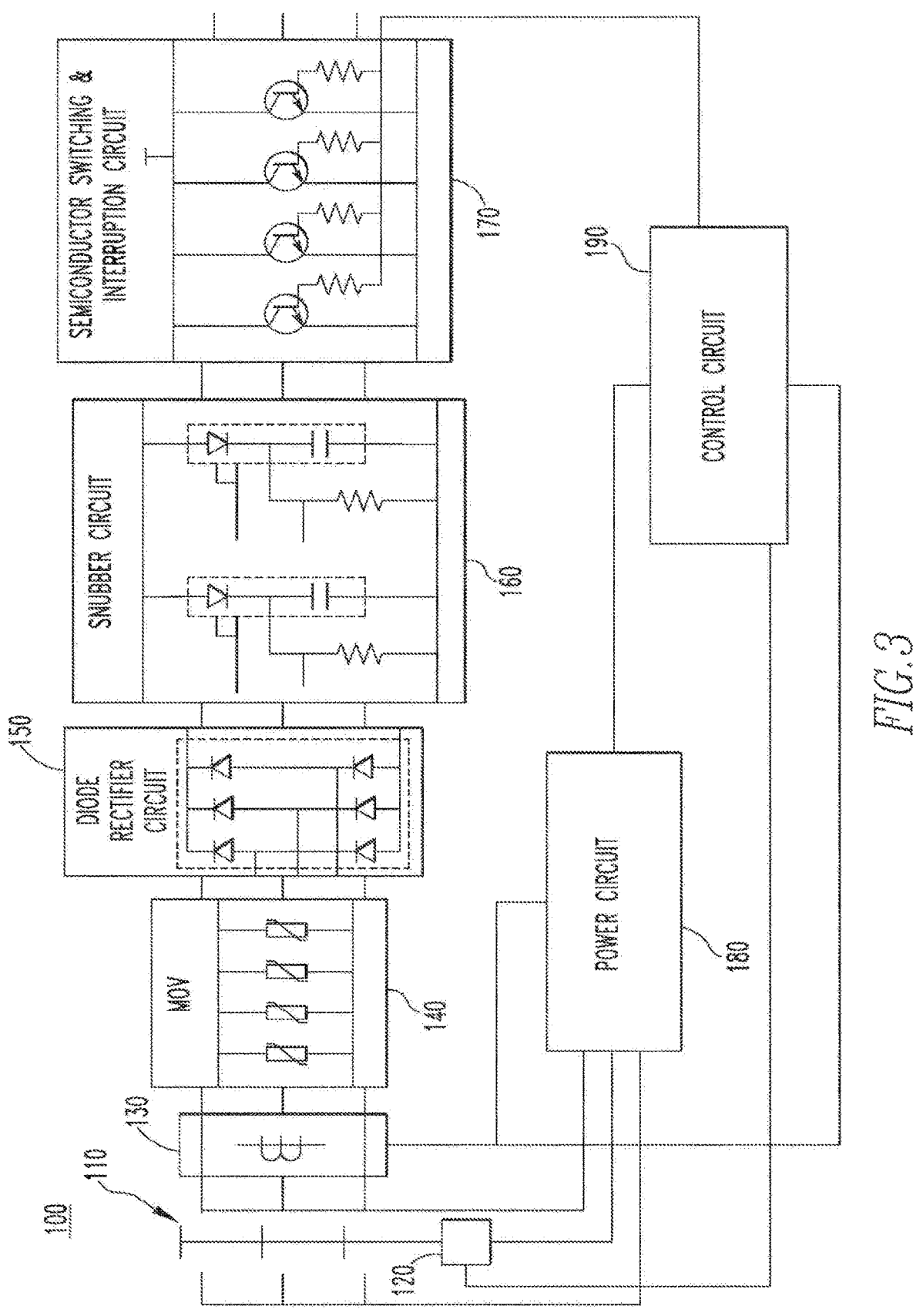
FIG. 3 is a schematic diagram of a combination motor control device in accordance with example embodiments of the disclosed concept.

FIG. 3 is a schematic diagram of the combination motor control device 100 in accordance with an example embodiment of the disclosed concept. The combination motor control device 100 in the example embodiment of FIG. 3 may be employed, for example and without limitation, as a motor starter. The combination motor control device 100 provides the functionality of a solid state circuit breaker via a control circuit 190 and a semiconductor switching and interruption circuit 170, as will be described in more detail herein. The combination motor control device 100 also includes an isolation switch 110, a magnetic actuator 120, current transformers 130, a metal oxide varistor (MOV) circuit 140, a diode rectifier circuit 150, a snubber circuit 160, and a power circuit 180.

The isolation switch 110 is disposed along line conductors. The line conductors receive power from a power source such as utility power. Opening the isolation switch 110 provides galvanic isolation. The magnetic actuator 120 is structured to actuate to open the isolation switch 110. Actuation of the magnetic switch is controlled by the control circuit 190. In some example embodiments of the disclosed concept, the isolation switch 110 is a clinch joint. The clinch joint design allows the contact structure to utilize current generated magnetic force to keep the contact closed during overload or short circuit events without a large switching mechanism with very high contact spring force. The isolation switch 110 may also be a fusible switch to provide circuit protection to potential short circuit when the diode rectifier circuit 150 is used. However, it will be appreciated that other types of switches may be employed without departing from the scope of the disclosed concept.

The MOV circuit 140 is electrically connected between the isolation switch 110 and the diode rectifier circuit 150. The MOV circuit 140 includes one or more MOVs. The MOV circuit 140 is structured to clamp voltage to provide protection against high voltages from events such as surges or impulses. It will be appreciated by those having ordinary skill in the art that the selection and arrangement of components in the MOV circuit 140 is one example, but other components and arrangements may be employed without departing from the scope of the disclosed concept.

The diode rectifier circuit 150 is electrically connected between the MOV circuit 140 and the snubber circuit 160. The diode rectifier circuit 150 includes diodes arranged as a bridge rectifier. The diode rectifier circuit 150 rectifiers line AC power into DC power. The diode rectifier circuit 150 allows the combination motor starter 100 to achieve switching capability with a minimum number of solid state transistors.

The snubber circuit 160 is electrically connected between the bi-direction circuit 150 and the semiconductor switching and interruption circuit 170. The snubber circuit 160 includes one or more resistors, diodes, and capacitors arranged as a snubber. The snubber circuit 160 is structured to absorb energy and provide protection against events such as voltage transients. It will be appreciated by those having ordinary skill in the art that the selection and arrangement of components in the snubber circuit 160 is one example, but other components and arrangements may be employed without departing from the scope of the disclosed concept.

The semiconductor switching and interruption circuit 170 includes a number of solid state transistors such as insulated gate bipolar transistors (IGBTs). The transistors may also be other types of transistors such as, without limitation, metal-oxide-semiconductor field-effect-transistors (MOSFETs), integrated gate-commutated thyristors (IGCTs) or other types of transistors. The transistors are controlled by the control circuit 190. The transistors may be switched to allow current to flow to the electric motor 200 (shown in FIG. 2) or to prevent current from flowing to the electric motor 200. In its motor start function, the control circuit 190 switches the transistors to allow current to flow to the electric motor 200.

The current transformers 130 are arranged to sense current flowing through the line conductors. The current transformers 130 may also be used to harvest power from the line conductors. Outputs of the current transformers 130 are electrically connected to the power circuit 180. The power circuit 180 is also electrically connected to one or more of the line conductors. The power circuit 180 is structured to sense current flowing through the line conductors via the current transformers 130. The power circuit 180 is also structured to sense voltage of the line conductors via its electrical connection to the line conductors.

The power circuit 180 is further configured harvest power to provide power to operate the control circuit 190. The power circuit 180 may receive power via its electrical connection to the line conductors and then use the received power to power the control circuit 190. The power circuit 180 may also harvest power received via the current transformers 130 and then use the received power to power the control circuit 190. In some example embodiments of the disclosed concept, the power circuit 180 is electrically connected to the line conductors on the line side of the isolation switch 110. The power circuit 180 uses power received from its electrical connection to the line conductors to power the control circuit 190 when the isolation switch 110 is open. After the isolation switch 110 closes, the power circuit 180 then uses the power received from the current transformers 130 to power the control circuit 190.

The control circuit 190 is structured to control the transistors in the semiconductor switching and interruption circuit 170 to open and close. The control circuit 190 is structured to open and close the transistors in order to provide a motor starter functionality. For example, the control circuit 190 may control the transistors in response to an external signal.

The control circuit 190 is also structured to provide circuit protection functionality such as that provided by an electronic trip unit in a circuit breaker. For example, the control circuit 190 is structured to receive sensed voltage and current levels from the power circuit 180. The control circuit 190 is structured to monitor the sensed voltage and current levels for faults in the power flowing through the line conductors and to initiate a trip in response to detecting a fault. It will be understood by those having ordinary skill in the art that control circuit 190 may detect many different types of faults and may determine whether and when to initiate a trip based on the type and severity of the fault.

The control circuit 190 initiates a trip by controlling the transistors in the semiconductor switching and interruption circuit 170 to switch to prevent power from flowing from the line to load side of the combination motor control device 100. The transistors are solid state components that are capable of switching very quickly in a matter of microseconds.

The control circuit 190 is also structured to control the magnetic actuator 120 to open the isolation switch 110. When the control circuit 190 initiates a trip, the control circuit 190 may also control the isolation switch 110 to open after the transistors have switched.

The control circuit 190 provides the combined control functionality of a motor starter control circuit and an electronic trip unit in a circuit breaker. The semiconductor switching and interrupter circuit 170 is used both for motor starter switching and circuit interruption. By integrating circuit breaker functionality into the combination motor control device 100, the combination motor control device 100 does not need an external circuit breaker to provide protection for it. Additionally, by using the semiconductor switching and interruption circuit 170 for dual purposes, the functionality of the combination motor control device 100 is increased without the addition of too many extra components.

In some example embodiments of the disclosed concept, the control circuit 190 may also provide a motor control functionality. For example and without limitation, the control circuit 190 may control the transistors in the semiconductor switching and interruption circuit 170 to pulse width modulate power provided to the electric motor 200 in order to control the electric motor 200.

In some example embodiments, the power circuit 180 and/or the control circuit 190 may each include a processor and associated memory. The memory may be included in the processor or as a separate component. The processor may be, for example and without limitation, a microprocessor, a microcontroller, or some other suitable processing device or circuitry, that interfaces with the memory or another suitable memory. The memory may be any of one or more of a variety of types of internal and/or external storage media such as, without limitation, RAM, ROM, EPROM(s), EEPROM(s), FLASH, and the like that provide a storage register, i.e., a machine readable medium, for data storage such as in the fashion of an internal storage area of a computer, and can be volatile memory or nonvolatile memory. The memory may also store one or more routines that the processor is structured to execute.

Figure 4:
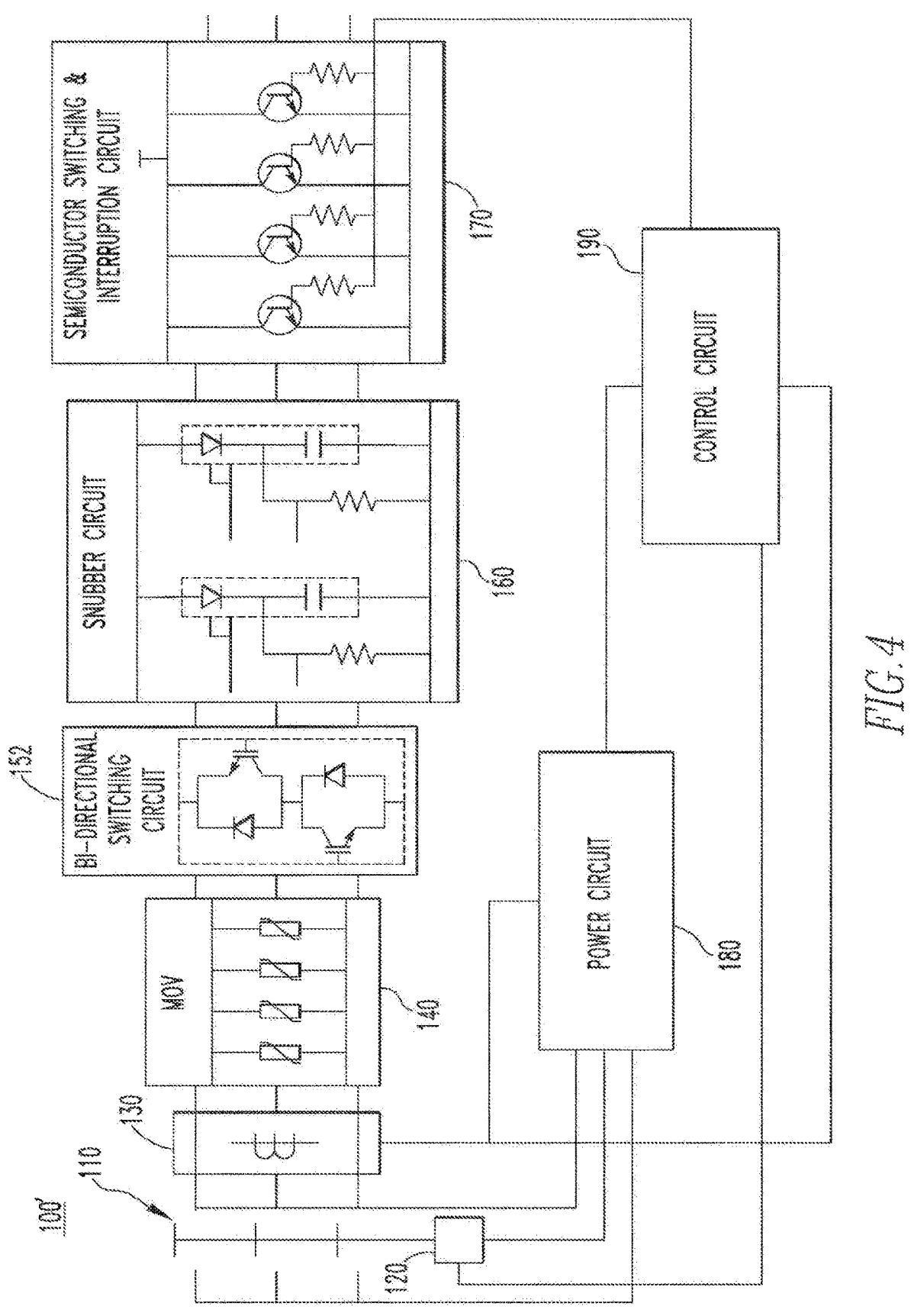
FIG. 4 is a schematic diagram of a combination motor control device in accordance with another example embodiment of the disclosed concept.

FIG. 4 is a schematic diagram of the combination motor control device 100' in accordance with another example embodiment of the disclosed concept. The combination motor control device 100' of FIG. 4 is similar to the combination motor control device 100 of FIG. 3. The combination motor control device 100' of FIG. 4 includes an isolation switch 110, magnetic actuator 120, MOV circuit 140, snubber circuit 160, semiconductor switching and interruption circuit 170, power circuit 180, and control circuit 190 similar to the combination motor control device 100 of FIG. 3. For economy and clarity of disclosure, a repeated description of these components is omitted. The combination motor control device 100' of FIG. 4 differs from the combination motor control device 100 of FIG. 3 in that the combination motor control device 100' includes a bi-directional switching circuit 152 instead of the diode rectifier circuit 150.

The bi-directional switching circuit 152 includes switching devices and diodes arranged as a bi-directional bridge rectifier. The bi-directional switching circuit 152 rectifies the line AC power into DC power. The bi-directional switching circuit 152 allows the combination motor starter to achieve bi-directional switching capability with a minimum number of solid state switching transistors, allowing current to flow from the line to load side of the combination motor control device 100' and vice versa. The bi-directional switches can be controlled to protect the rest of the circuitry against any fault conditions on the utility side, inside the combination motor control device 100", or on the load side. It will be appreciated by those having ordinary skill in the art that the selection and arrangement of components in the bi-direction switching circuit 152 is one example, but other components and arrangements may be employed without departing from the scope of the disclosed concept.

Figure 5:
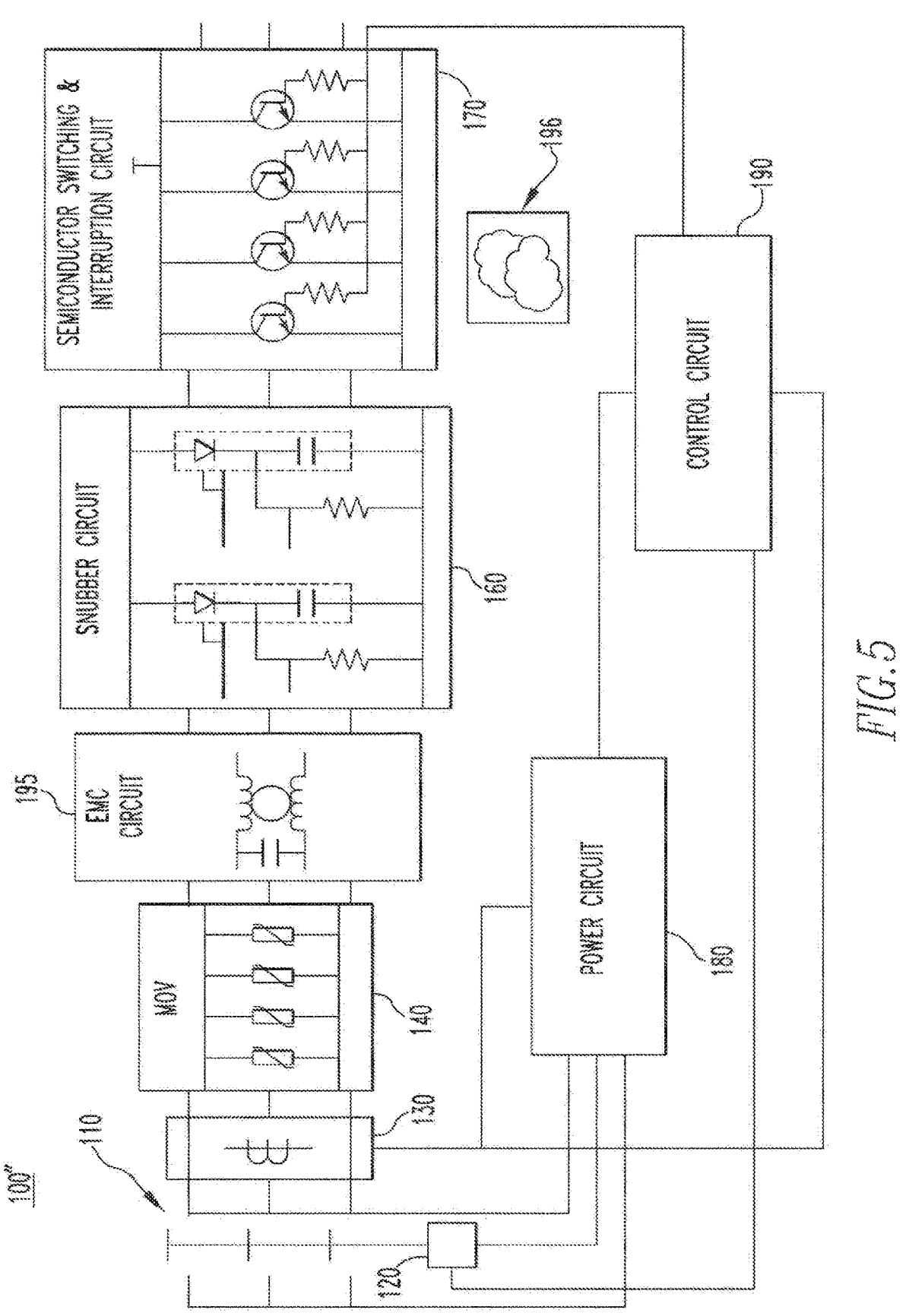
FIG. 5 is a schematic diagram of a combination motor control device in accordance with another example embodiment of the disclosed concept.

FIG. 5 is a schematic diagram of a combination motor control device 100" in accordance with another example embodiment of the disclosed concept. The combination motor control device 100" of FIG. 5 is similar to the combination motor control device 100 of FIG. 3. The combination motor control device 100" of FIG. 5 includes an isolation switch 110, magnetic actuator 120, MOV circuit 140, snubber circuit 160, semiconductor switching and interruption circuit 170, power circuit 180, and control circuit 190 similar to the combination motor control device 100 of FIG. 3. For economy and clarity of disclosure, a repeated description of these components is omitted. The combination motor control device 100" of FIG. 5 differs from the combination motor control device 100 of FIG. 3 in that the combination motor control device 100" includes an electromagnetic compatibility (EMC) circuit 195 instead of the diode rectifier circuit 150. The EMC circuit 195 provides electromagnetic filtering that mitigates the effects of electromagnetic interference.

The combination motor control device 100" also includes a cloud computing module 196. The cloud computing module 196 may communicate with one or more external devices via a network (e.g., without limitation, the internet). The cloud computing module 196 may gather input from one or more sensors and provide system health diagnostics and prognostics of the combination motor control device 100'. The cloud computing module 196 may also provide for remote monitoring and control of the combination motor control device 100". The cloud computing module 196 may also provide cybersecurity for the combination motor control device 100".

While FIGS. 3-5 illustrate examples of components and their arrangements in example combination motor control devices 100,100',100", it will be appreciated by those having ordinary skill in the art that the disclosed concept is not limited to the example embodiments of FIGS. 3-5. Different components and arrangements may be employed without departing from the scope of the disclosed concept. It will also be appreciated that the disclosed concept is not limited to motor control devices and may be employed in other applications without departing from the scope of the disclosed concept.

Figure 6:
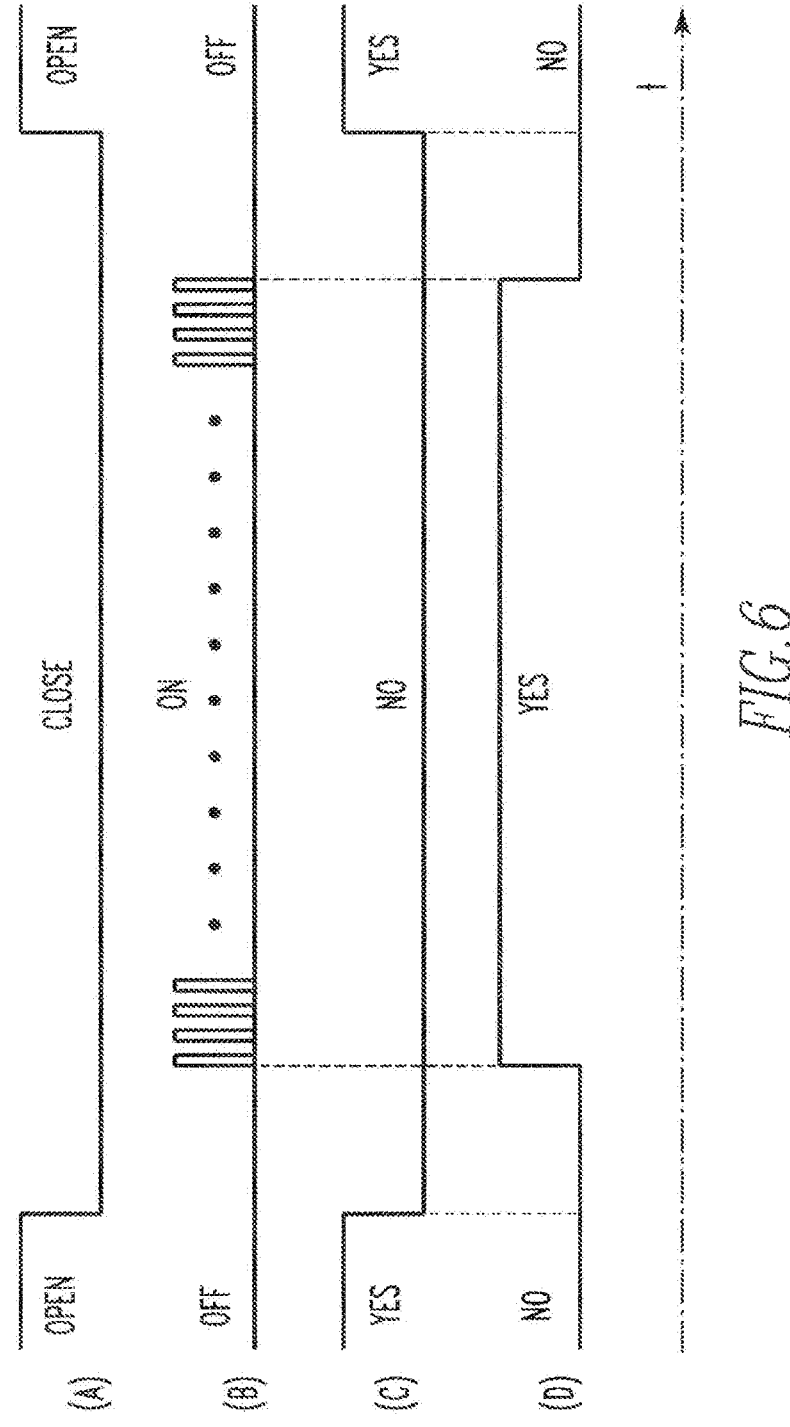
FIG. 6 is a timing diagram for operation of a combination motor control device in accordance with an example embodiment of the disclosed concept.

FIG. 6 is a timing diagram of operation of the combination motor control device 100 in accordance with an example embodiment of the disclosed concept. FIG. 6 includes plots (a), (b), (c), and (d). Plot (a) shows the timing of operation of the isolation switch 110. Plot (b) shows the timing of operation of the semiconductor switching and interruption circuit 170. Plots (c) and (d) show timing of the power harvesting performed by the power circuit 180.

In some example embodiments of the disclosed concept, the isolation switch 110 is closed before the semiconductor switching and interruption circuit 170 is turned on (i.e., allows power to flow to the electric motor 200) and the isolation switch 110 is open after the semiconductor switching and interruption circuit 170 is turned off (i.e., stops allowing power to flow to the electric motor 200). Plots (a) and (b) reflect that the isolation switch 110 is closed before the semiconductor switching and interruption circuit 170 is turned on and is open after the semiconductor switching and interruption circuit 170 is turned off.

In some example embodiments, the power circuit 180 harvests power via its electrical connection to the line conductors while the isolation switch 110 is open or the semiconductor switching and interruption circuit 170 is turned off, as is reflected in plots (a), (b), and (c). When the isolation switch 110 is closed and the semiconductor switching and interruption circuit 170 is turned on, the power circuit 180 harvests power via the current transformers 130, as is reflected in plots (a), (b), and (d). Harvesting power via the current transformers 130 is more efficient, but is not always available.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A combination motor control device comprising:
a line side structured to electrically connect to a power source;
a load side structured to electrically connect to a motor;
a bi-directional switching circuit structured to allow current to flow from the line side to the load side and from the load side to the line side of the combination motor control device, wherein the bi-directional switching circuit includes a bi-directional bridge rectifier;
a semiconductor switching and interruption circuit coupled to an output side of the bi-directional switching circuit and including a number of solid-state transistors and being operable to turn on to allow power to flow through the combination motor control device and to turn off to stop allowing power to flow through the combination motor control device;
a power circuit structured to sense voltage and/or current flowing through the combination motor control device at a location upstream and in front of the bi-directional switching circuit and the semiconductor switching and interruption circuit;
a control circuit structured to provide a motor start function, as a motor starter control circuit, and to provide a circuit protection function, as an electronic trip unit in a circuit breaker, the control circuit configured to:
detect a fault in power flowing through the combination motor control device based on the sensed voltage and/or current, to control the semiconductor switching and interruption circuit to provide the circuit protection function via determining whether to initiate a trip based on a type and severity of the fault, and to control the semiconductor switching and interruption circuit to turn off in response to detecting the fault and in response to a determination to initiate the trip, and
provide the motor start function via controlling the semiconductor switching and interruption circuit in response to an external signal to switch the number of solid-state transistors to allow current to flow to the motor; and
line conductors on the line side configured to receive power from a power source, wherein the power circuit is structured to harvest power, to power the control circuit, via an electrical connection to the line conductors while the semiconductor switching and interruption circuit is off.

2. The combination motor control device of claim 1, further comprising:
an isolation switch disposed along line conductors and structured to open to provide galvanic isolation between the line side and the load side of the combination motor control device; and
an actuator structured to open the isolation switch, wherein the control circuit is structured to control the actuator to open the isolation switch.

3. The combination motor control device of claim 2, wherein the actuator is a magnetic actuator.

4. The combination motor control device of claim 3, wherein the isolation switch is a clinch joint.

5. The combination motor control device of claim 4, wherein the clinch joint allows contacts to utilize current generated magnetic force to keep the contacts closed during the fault.

6. The combination motor control device of claim 2, wherein the control circuit is structured to, in response to detecting the fault in power flowing through the combination motor control device, control the actuator to open the isolation switch after controlling the semiconductor switching and interruption circuit to turn off.

7. The combination motor control device of claim 1, wherein the bidirectional switches are controlled by the control circuit to protect against a fault on the line side or a fault on the load side.

8. The combination motor control device of claim 1, further comprising:
an electromagnetic filtering circuit (EMC) electrically coupled between the line and load sides and being structured to provide electromagnetic filtering.

9. The combination motor control device of claim 1, wherein the solid-state transistors include at least one of an insulated gate bipolar transistor (IGBT), a metal-oxide-semiconductor field-effect-transistor (MOSFET), or an integrated gate-commutated thyristor (IGCT).

10. The combination motor control device of claim 1, wherein the control circuit is structured to control the semiconductor switching and interruption circuit by turning on or turning off the number of solid-state transistors.

11. The combination motor control device of claim 2, wherein the power circuit is structured to harvest power to provide power to operate the control circuit.

12. The combination motor control device of claim 11, further comprising:
a number of line conductors structured to carry power through the combination motor control device,
wherein the power circuit includes a current transformer arranged to sense current flowing through one or more of the line conductors and to harvest power from power flowing through the one or more of the line conductors, and
wherein the power circuit is electrically connected to the one or more of the line conductors and is structured to harvest power from the electrical connection to the one or more line conductors.

13. The combination motor control device of claim 11, wherein the power circuit is structured to harvest power via the current transformer when the isolation switch is closed and to harvest power via the electrical connection to the one or more line conductors when the isolation switch is open.

14. The combination motor control device of claim 1, further comprising:
a snubber circuit structured to absorb energy and provide protection against voltage transients.

15. The combination motor control device of claim 1, wherein the solid-state switches switch in micro-seconds.

16. The combination motor control device of claim 1, further comprising:
current transformers structured to harvest power from the line conductors; and
an isolation switch structured to open to provide galvanic isolation between the line side and
the load side, wherein the power circuit is structured to harvest power, to power the control circuit, from the current transformers while the isolation switch is closed and the semiconductor switching and interruption circuit is on.

17. An electric motor system comprising:

a motor;

a combination motor control device comprising:

a line side structured to electrically connect to a power source;

a load side structured to electrically connect to the motor;

a semiconductor switching and interruption circuit including a number of solid-state transistors and being operable to turn on to allow power to flow through the combination motor control device and to turn off to stop allowing power to flow through the combination motor control device;

a power circuit structured to sense voltage and/or current flowing through the combination motor control device;

a control circuit structured to provide a motor start function, as a motor starter control circuit, and to provide a circuit protection function, as an electronic trip unit in a circuit breaker, the control circuit configured to:

detect a fault in power flowing through the combination motor control device based on the sensed voltage and/or current, to control the semiconductor switching and interruption circuit to provide the circuit protection function via determining whether to initiate a trip based on a type and severity of the fault, and to control the semiconductor switching and interruption circuit to turn off in response to detecting the fault and in response to a determination to initiate the trip, and provide the motor start function via controlling the semiconductor switching and interruption circuit in response to an external signal to switch the number of solid-state transistors to allow current to flow to the motor; and line conductors on the line side configured to receive power from a power source, wherein the power circuit is structured to harvest power, to power the control circuit, via an electrical connection to the line conductors while the semiconductor switching and interruption circuit is off.

18. The electric motor system of claim 17, further comprising:

current transformers structured to harvest power from the line conductors; and an isolation switch structured to open to provide galvanic isolation between the line side and the load side, wherein the power circuit is structured to harvest power, to power the control circuit, from the current transformers while the isolation switch is closed and the semiconductor switching and interruption circuit is on.

* * * * *